US011206453B2

(12) United States Patent
Ramos et al.

(10) Patent No.: US 11,206,453 B2
(45) Date of Patent: Dec. 21, 2021

(54) COGNITIVE BROADCASTING OF AN EVENT

(71) Applicant: International Business Machines Corporation, Armonk, NY (US)

(72) Inventors: Igor S. Ramos, Round Rock, TX (US); Angelo Danducci, II, Austin, TX (US); Devon E. Mensching, Austin, TX (US); Kimberly J. Taft, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/848,354

(22) Filed: Apr. 14, 2020

(65) Prior Publication Data
US 2021/0321163 A1   Oct. 14, 2021

(51) Int. Cl.
*H04N 21/466* (2011.01)
*G06Q 30/02* (2012.01)
(Continued)

(52) U.S. Cl.
CPC ......... *H04N 21/4662* (2013.01); *G06N 20/00* (2019.01); *G06Q 30/0201* (2013.01);
(Continued)

(58) Field of Classification Search
CPC ................................................. H04N 21/4662
See application file for complete search history.

(56) References Cited

U.S. PATENT DOCUMENTS 7,206,434 B2    4/2007  Overton
7,558,809 B2    7/2009  Radhakrishnan
(Continued)

FOREIGN PATENT DOCUMENTS

CN    108962257 A    12/2018
CN    109271534 A    1/2019
(Continued)

OTHER PUBLICATIONS

Asqib Saeed, "Urban Sound Classification with Neural Networks in TensorFlow", University of Twente, 2016.
(Continued)

*Primary Examiner* — Michael H Hong
(74) *Attorney, Agent, or Firm* — Law Office of Jim Boice

(57) ABSTRACT

A method utilizes Artificial Intelligence (AI) system to broadcast a real-time event to a particular broadcast audience. The AI system receives a profile of a particular broadcast audience for a real-time event, and concurrent real-time Audio/Video (/V) streams for a particular portion of the real-time event. The AI system ranks the concurrent real-time A/V streams for the particular portion of the real-time event based on the types of event activities depicted in each of the concurrent real-time A/V streams and the profile of the particular broadcast audience for the real-time event; selects a particular real-time A/V stream, from the concurrent real-time A/V streams, for the particular broadcast audience based on the ranking; and directs a performance of a broadcast action related to the selected particular real-time A/V stream.

20 Claims, 11 Drawing Sheets

(51) Int. Cl.
    *G06N 20/00*   (2019.01)
    *H04N 21/845*  (2011.01)
    *H04N 21/45*   (2011.01)
    *H04N 21/439*  (2011.01)
    *H04N 21/44*   (2011.01)
    *H04N 21/2187* (2011.01)

(52) U.S. Cl.
    CPC ..... *H04N 21/2187* (2013.01); *H04N 21/4398* (2013.01); *H04N 21/44* (2013.01); *H04N 21/4532* (2013.01); *H04N 21/8456* (2013.01)

(56) References Cited

U.S. PATENT DOCUMENTS

| | | | |
|---|---|---|---|
| 9,240,213 B2 | 1/2016 | Gerstlberger | |
| 9,565,491 B2 | 2/2017 | Baker | |
| 9,979,499 B2 | 5/2018 | Oldfield | |
| 2001/0014621 A1* | 8/2001 | Okubo | A63F 13/54 |
| | | | 463/35 |
| 2004/0261096 A1* | 12/2004 | Matz | H04N 21/4542 |
| | | | 725/28 |
| 2015/0297949 A1 | 10/2015 | Aman | |
| 2017/0214945 A1* | 7/2017 | Chang | H04N 21/4788 |
| 2018/0189570 A1* | 7/2018 | Paluri | G06K 9/623 |
| 2018/0250600 A1* | 9/2018 | Trombetta | A63F 13/86 |

FOREIGN PATENT DOCUMENTS

| | | |
|---|---|---|
| CN | 109767777 A | 5/2019 |
| WO | 2018189058 A1 | 10/2018 |

OTHER PUBLICATIONS

GitHub, "Audio Tagging System with Probabilistic Programming".
YouTube, "Action recognition applied on basketball players through Deep Learning methods", Apr. 26, 2018.
P. Mell et al., "The NIST Definition of Cloud Computing", National Institute of Standards and Technology, Information Technology Laboratory, Sep. 2011, pp. 1-7.

* cited by examiner

COGNITIVE BROADCASTING OF AN EVENT

BACKGROUND

The present invention relates to the field of broadcasting an event over an airwave, cable, or other transmission media. Still more specifically, the present invention relates to the use of an Artificial Intelligence (AI) system to determine what content is broadcast to a particular type of content viewer.

SUMMARY

In an embodiment of the present invention, a method utilizes an Artificial Intelligence (AI) system to broadcast a real-time event to a particular broadcast audience. The AI system receives a profile of a particular broadcast audience for a real-time event, and concurrent real-time Audio/Video (AV) streams for a particular portion of the real-time event. The AI system has been trained to rank the concurrent real-time A/V streams for the particular portion of the real-time event based on types of event activities depicted in each of the concurrent real-time A/V streams and the profile of the particular broadcast audience for the real-time event. The AI system ranks the concurrent real-time A/V streams for the particular portion of the real-time event based on the types of event activities depicted in each of the concurrent real-time A/V streams and the profile of the particular broadcast audience for the real-time event; selects a particular real-time A/V stream, from the concurrent real-time A/V streams, for the particular broadcast audience based on the ranking; and directs a performance of a broadcast action related to the selected particular real-time A/V stream.

In one or more embodiments, the method(s) described herein are performed by an execution of a computer program product and/or by a computer system and/or by an Artificial Intelligence (AI) system.

The terms "A/V feed" and "A/V stream" are used interchangeably herein to describe an audio-video stream of information from video cameras and/or microphones.

DETAILED DESCRIPTION

Figure 1:
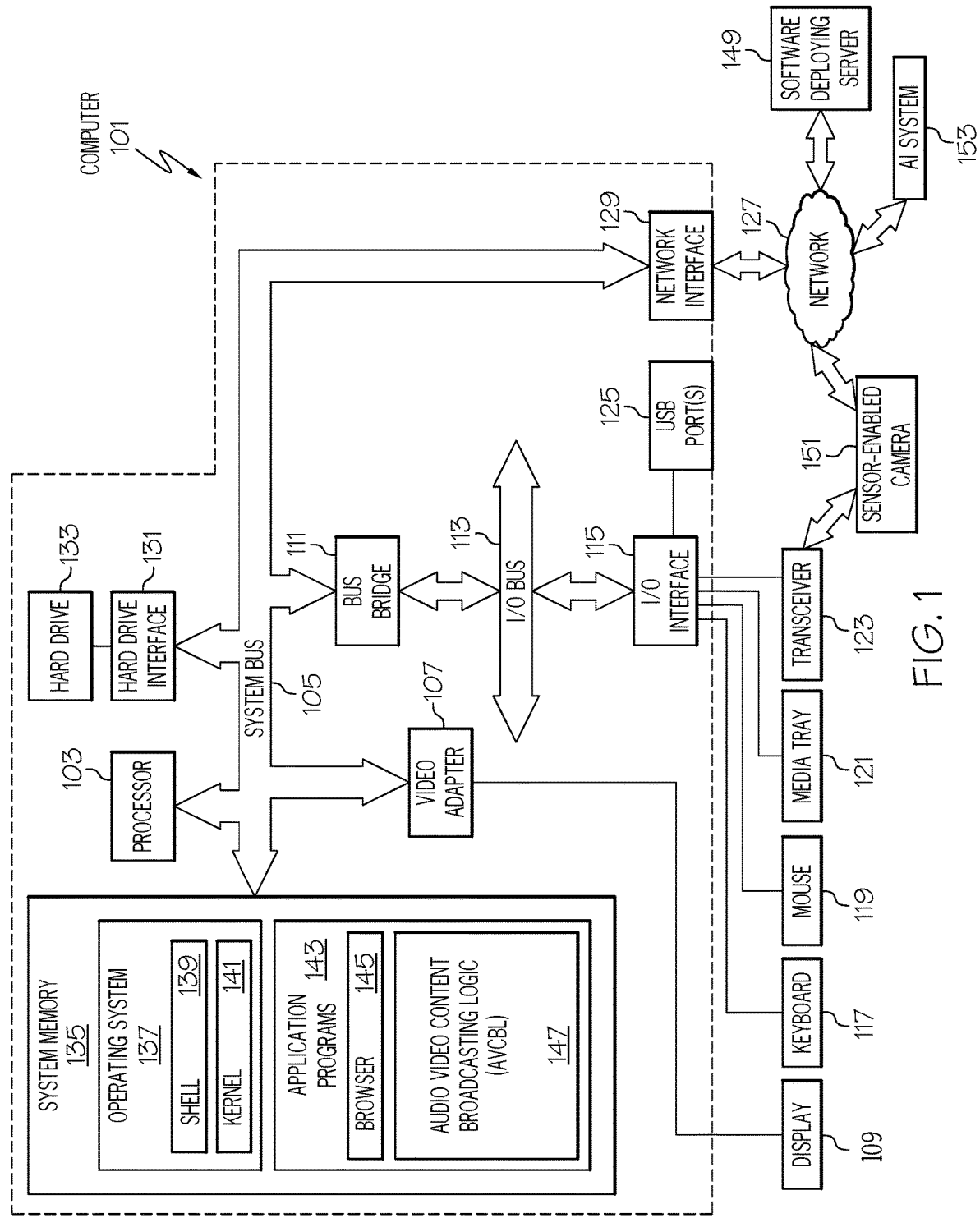
FIG. 1 depicts an exemplary system and network in which the present disclosure may be implemented in one or more embodiments of the present invention.

Production Control Room (PCR) is the place in a television studio in which the composition of the outgoing program takes place. As such, a PCR contains equipment for receiving Audio/Video (A/V) feeds (e.g., from a real-time event, such as a sporting event), monitors for viewing such A/V feeds, and equipment for directing the public broadcasting (e.g., via the airwaves, a webcast on the Internet, a dedicated cable line, etc.) of a such A/V feeds. In an exemplary PCR, there are often 16 or more different screens that the producer must watch, and even more control buttons, switches, etc. buttons that the producer must control.

As such, for large sporting events, such as a major tennis tournament, it can be challenging for even the most experienced audio and video engineers to select what the end user (broadcast viewer) should see and hear.

Video engineers are often faced with multiple screens at the same time, which can cause them to miss some of the action. This leaves viewers watching action with an optimal angle only during a replay instead of live.

Sound engineers face a similar issue. That is, for a sound engineer, there can be so many different sounds and background noises that it is difficult to focus on what is happening.

Hence, there is a need to be able to easily identify and filter such sounds and video, so when users are watching a game at home, they do not have to listen to unwanted crowd noise or sounds over the Public Address (PA) system at the event site, and they can also have the best viewing experience.

As such, one or more embodiments of the present invention creates a real-time quality ranking of available audio and video streams for a live event, thus allowing an Artificial Intelligence (AI) system, and/or the producer of the broadcast for the live event, to fine tune their focus to where the action is happening.

In one or more embodiments, the present invention uses machine learning (e.g., an AI system) to: 1) determine a game state of an event; and 2) select what content is broadcast to a particular audience based on that particular audience's profile and the game state. In one or more embodiments of the present invention, the AI system uses real time filtering to manipulate what audio and video reaches the broadcast operator (i.e., the engineer and/or producer who are determining what A/V feeds are sent to a particular audience).

Thus, one or more embodiments of the present invention are configurable to cater to what a user (e.g., the A/V engineer, the show producer, the broadcast audience) wants to hear or see and what they want to block.

For example, one broadcaster, producer, audience might want to filter out crowd noise from a basketball game during a broadcast; while another broadcaster, producer, audience might like the crowd noise at games, but want to filter out the music playing on the Public Address (PA) system during a time out.

One or more embodiments of the present invention provides a system that enables cognitive broadcast training based on past broadcasts, engineer's operations, and game analytics. That is, in one or more embodiments of the present invention, the AI system described herein initially determines which A/V content from a real-time event to broadcast based on the activities in the real-time event and past selections made by a particular engineer/producer and/or a cohort of engineers/producers. Current selections from the AI system that are affirmed or rejected by the engineer(s)/producer(s) are then used as feedback for fine tuning the AI system.

One or more embodiments of the present invention provide cross learning between audio and video domains. That is, in one or more embodiments, the present invention utilizes audio content to change video content. For example, assume that the event is a baseball game, that there are multiple video cameras directed at different parts of the ball park, and that the audio content in an A/V feed is that of a bat hitting a pitched baseball. This audio content (sound of the bat hitting the pitched baseball) automatically causes the selection of a video feed from a camera aimed at all areas of the ballpark other than the batter's box to be broadcast, since that is where the next event (catching the hit ball, the ball going out of the ballpark, etc.) will occur. Thus, the producer/engineer does not have to make any decision about which video to feed to the broadcast equipment. Rather, this decision is automatically performed. However, in one or more embodiments of the present invention, this automatic decision can be overridden by the producer/engineer, even though this overriding act will perhaps not show where the ball is going (in this example).

In one or more embodiments of the present invention, an artificial intelligence (machine learning) system uses the automatic actions of the system, and/or the override actions by the producer/engineer, as data of golden truth, which are used to fine tune the training of the artificial intelligence system. That is, assume that an Artificial Intelligence (AI) system received an audio feed of a certain pitch for a certain right-batting batter, who is known to predominantly pull pitches when he/she is at bat. As such, the AI system, which has been trained to assume that a particular sound (volume and pitch) of that batter hitting the ball will be a homerun over the left field wall. As such, the artificial intelligence system will automatically broadcast a video feed from the video camera that is aimed at the left field wall. However, if the ball actually goes elsewhere (e.g., the infield), then the AI system is retrained to be less confident that the ball will go over the left field wall, and thus a different shot (of the entire left side of the ballpark) will automatically be selected for transmission for that batter in the future.

In one or more embodiments of the present invention, the Audio/Video (A/V) broadcast stream is tailored to a particular type of viewer. For example, assume that Viewer A is a fan of football plays, while Viewer B is a fan of band music. As such, an AI system that controls the selection of the A/V broadcast stream is trained to feature A/V steams of action on the football field to Viewer A (i.e., most, if not all, of the A/V streams are of the football action), and to feature A/V streams of a band in the stands to Viewer B during the football game (i.e., most, if not all, of the A/V streams are of the band in the stands).

In one or more embodiments of the present invention, the AI system that controls the selection of the A/V stream to be broadcast excludes A/V streams that are of low quality. For example, assume that the event is a soccer game being played in inclement weather (rain, fog, snow, etc.). Assume further that the AI system determines that, based on an audio and/or video analysis of different A/V streams, that a first camera producing A/V stream A is aimed at an important event during the soccer game (e.g., a goal being scored) from an opposite side of the football field. That is, this camera shows the ball actually going into the goal. However, the inclement weather degrades A/V stream A to the point that is would be better if A/B stream B (from a second camera that is aimed along the front goal bar) were broadcast, since this second camera is closer to the action, even though it does not show the ball actually going into the goal. As such, the AI system causes the broadcast system to transmit the A/V stream B.

Thus, one or more embodiments of the present invention provides real time filtering, such that the system automatically provides desired content to certain types of viewers.

In one or more embodiments of the present invention, the sound level for an A/V stream being sent to a particular type of viewer is adjusted according to a profile for that particular type of viewer. For example, if a particular type of user enjoys the sound of a crowd at a sporting event (thus making that type of viewer feel like they are part of the real-time live action), then crowd sounds are amplified in the A/V stream. However, if this type of viewer is more interested in the action on the field (including audio action, such as play signals being called by a quarterback in a football game), then audio from the field is amplified and crowd noises, public address announcements, etc. at the game stadium are suppressed in the A/V stream being broadcast.

For example, consider the following exemplary use case.

Use Case: Often times at a baseball game, broadcast announcers are present at the game near the field. When viewers of a particular type are watching the broadcast game on a television/monitor, they often do not care about the noises happening at the stadium. Rather, all that they want to hear is the announcers, the crack of a bat and other noises happening on the field. As such, in one or more embodiments of the present invention, the presently describe AI systems will 1) determine the game state (e.g., the pitcher is about to pitch, the game is between innings, etc.) and 2) filter out crowd noise and sounds over the Public Address (PA) system (e.g., seventh inning stretch announcement, walk up songs for the batter, etc.).

This presently described A/V broadcast system can be applied to any type of live events, including, but not limited to, sporting events. Using microphones and video cameras placed around the stadium, a machine learning model is trained to determine the game state of the sporting event based on audio and video cues.

In addition, and in one or more embodiments of the present invention, Doppler echo sensors detect certain movements on the playing field, such as a baseball pitcher winding up to pitch from the pitching mound, a batter swinging in the batter's box, etc. That is, in these embodiments, rather than relying solely on cameras and microphones to generate A/V feeds that show the current game state of the game, a Doppler echo sensor is aimed at a particular player (e.g., the pitcher in a baseball game). Doppler echo sensors readings are then analyzed, using processing known to those skilled in the art of motion detection, to determine that this pitcher is about to pitch the ball, another player is moving to catch a hit or thrown ball, etc., thereby further describing the game state (based on actions by the players) of the game.

In one or more embodiments of the present invention, the AI system automatically determines which A/V stream is broadcast to a particular type of viewer. In one or more other embodiments, however, the A/V system gives a studio producer/engineer a few selections of A/V streams (e.g., 2-4 A/V streams from 16 available A/V streams) to choose from for a particular type of viewer. As such, the producer/engineer still has control over the broadcast, but is not overwhelmed by all 16 or more A/V stream choices.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 101 may be utilized by software deploying server 149 and/or sensor-enabled camera 151 and/or Artificial Intelligence (AI) system 153.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123, and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with external devices via a network 127 using a network interface 129. Network interface 129 is a hardware network interface, such as a network interface card (NIC), etc. Network 127 may be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems.

Application programs 143 in computer 101's system memory (as well as software deploying server 149's system memory) also include an Audio Video Content Broadcasting Logic (AVCBL) 147. AVCBL 147 includes code for implementing the processes described below, including those described in FIGS. 2-9. In one embodiment, computer 101 is able to download AVCBL 147 from software deploying server 149, including in an on-demand basis, wherein the code in AVCBL 147 is not downloaded until needed for execution. Note further that, in one embodiment of the present invention, software deploying server 149 performs all of the functions associated with the present invention (including execution of AVCBL 147), thus freeing computer 101 from having to use its own internal computing resources to execute AVCBL 147.

Note that the hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As discussed above, one or more embodiments of the present invention train a machine learning system to recognize certain game states for a real-time event (sporting or otherwise), in order to broadcast appropriate A/V streams for a particular type of audience.

Figure 2:
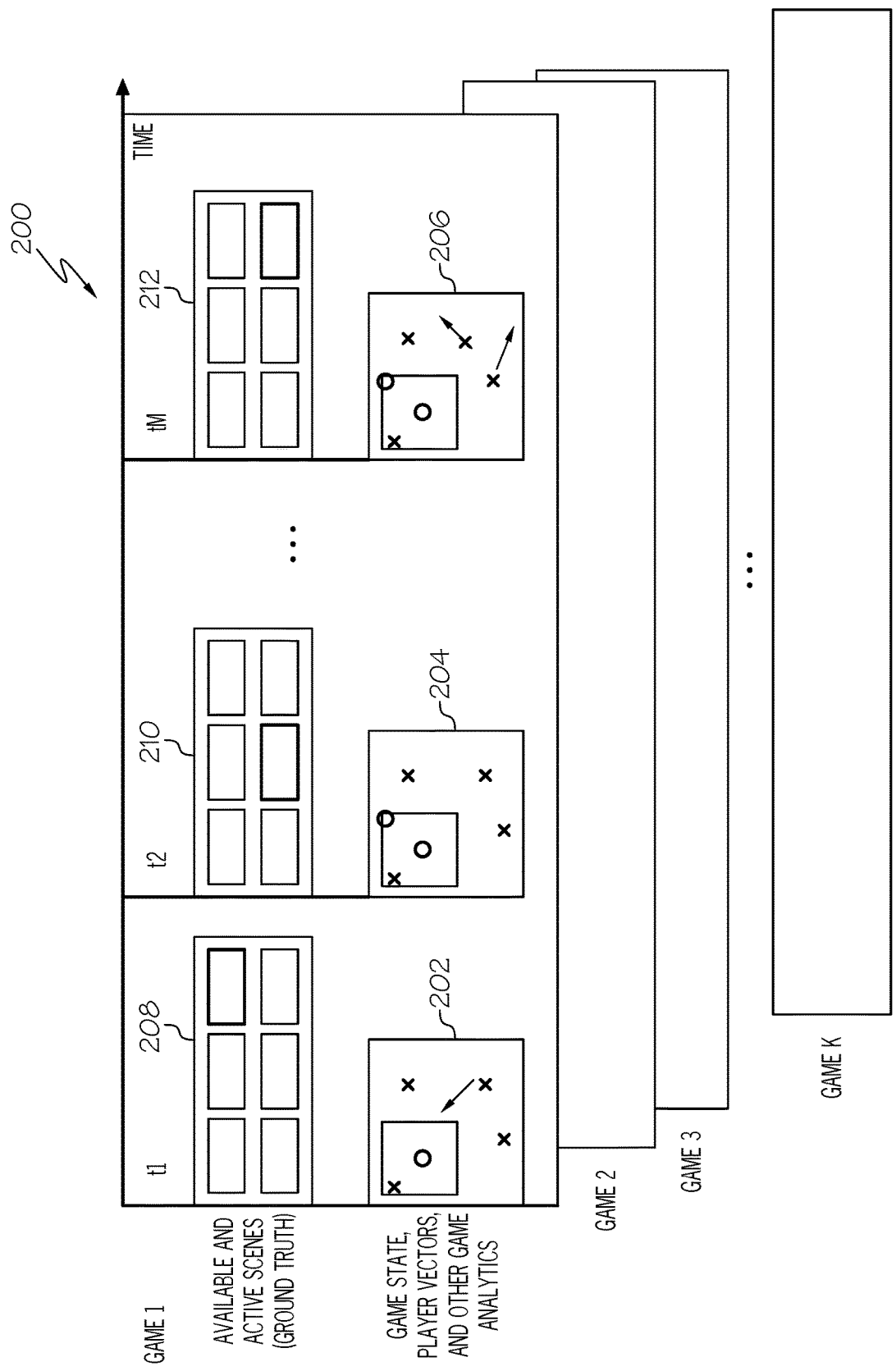
FIG. 2 depicts training material used in machine learning in accordance with one or more embodiments of the present invention.

With reference now to FIG. 2, learning training material 200 for an exemplary basketball game is presented.

An AI system-generated description of movement and activities of players (depicted as "x's" and "o's" in block 202) at time t1 for Game 1, changes at time t2 (as shown in block 204) and time tM (as shown in block 206). That is, an AI system is trained to describe the movement of players (i.e., the game state) in a sporting event, by recognizing certain patterns of player movement on a playing field/court. An exemplary AI system to perform this process is the Convolutional Neural Network (CNN) 753 shown in FIG. 7, which can be trained to recognize certain physical movements (e.g., movement of a bat) to define a game state (e.g., a particular player is swinging at a pitched ball).

However, the ground truths depicted in blocks 208, 210, and 212 describe where the players actually are and/or what they are actually doing (activities), as determined by a supervisory system trainer (e.g., a person). These ground truths are used to adjust the AI system in order to be more accurately trained.

Similar ground-truth based training of the AI system occurs for Game 2, Game 3, and Game K, which in one or more embodiments are played by the same teams as those that played Game 1. In one or more other embodiments of the present invention, similar ground-truth based training of the AI system occurs using Game 2, Game 3, and Game K, which are played by different teams as those that played Game 1.

Figure 3:
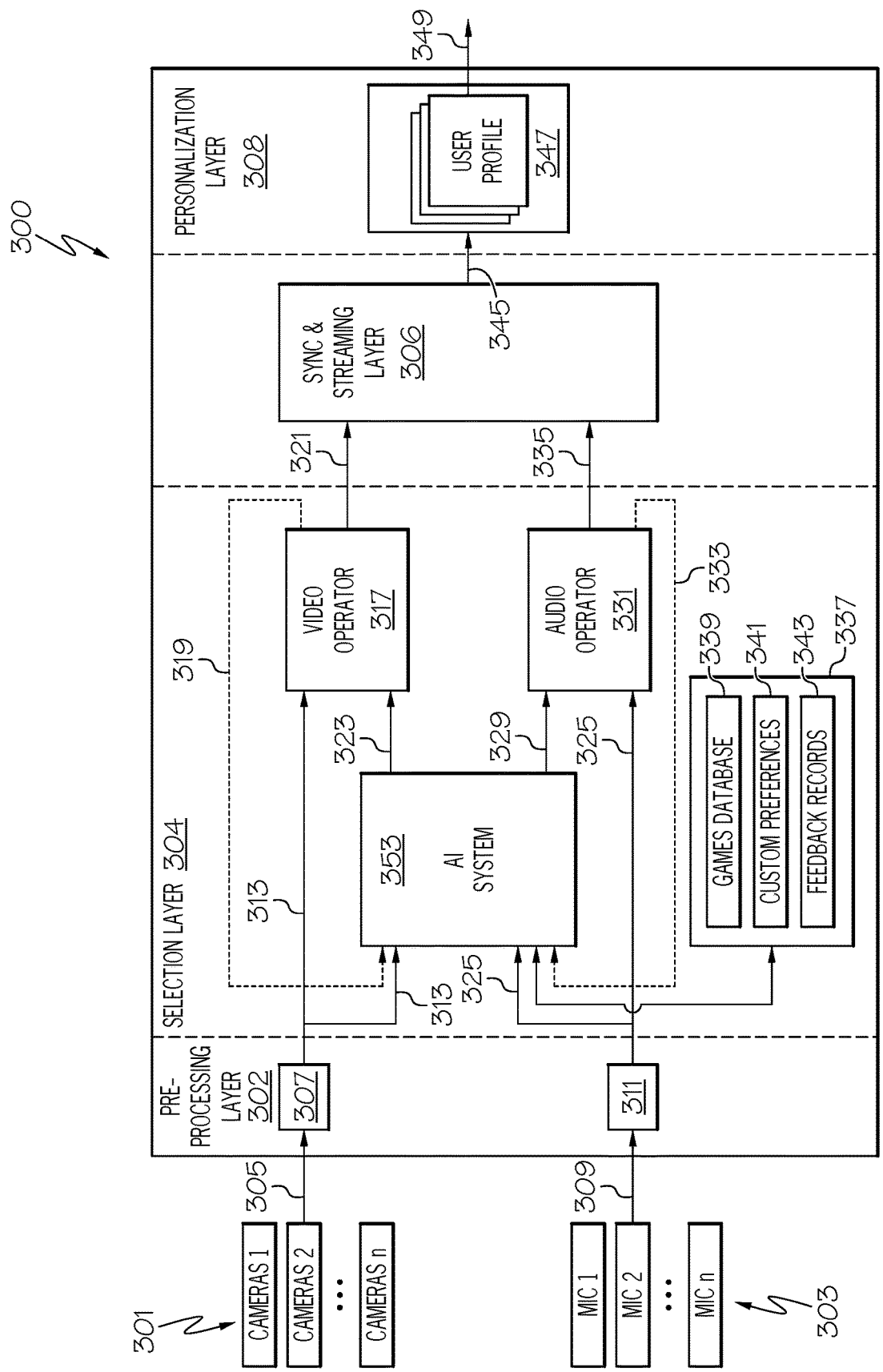
FIG. 3 illustrates a high-level overview of architecture used in one or more embodiments of the present invention.

With reference now to FIG. 3, a high-level overview of an exemplary architecture 300 used in one or more embodiments of the present invention is presented.

As shown in FIG. 3, architecture 300 utilizes multiple cameras 301 and multiple microphones 303 at an event site (e.g., a sports stadium).

As such, the cameras 301 send a video feed 305 to a video preprocessor 307 in that pre-processing layer 302 of the architecture 300, in order to generate pre-processed video feeds 313 An exemplary video preprocessor 307 adjusts the visual acuity of the video feed 305, blocks any video feeds that are of sub-par quality (e.g., due to inclement weather, as described above), etc. However, the video preprocessor 307 does not adjust or block any video feeds based on their content. This is the job of the AI system 353.

Figure 4:
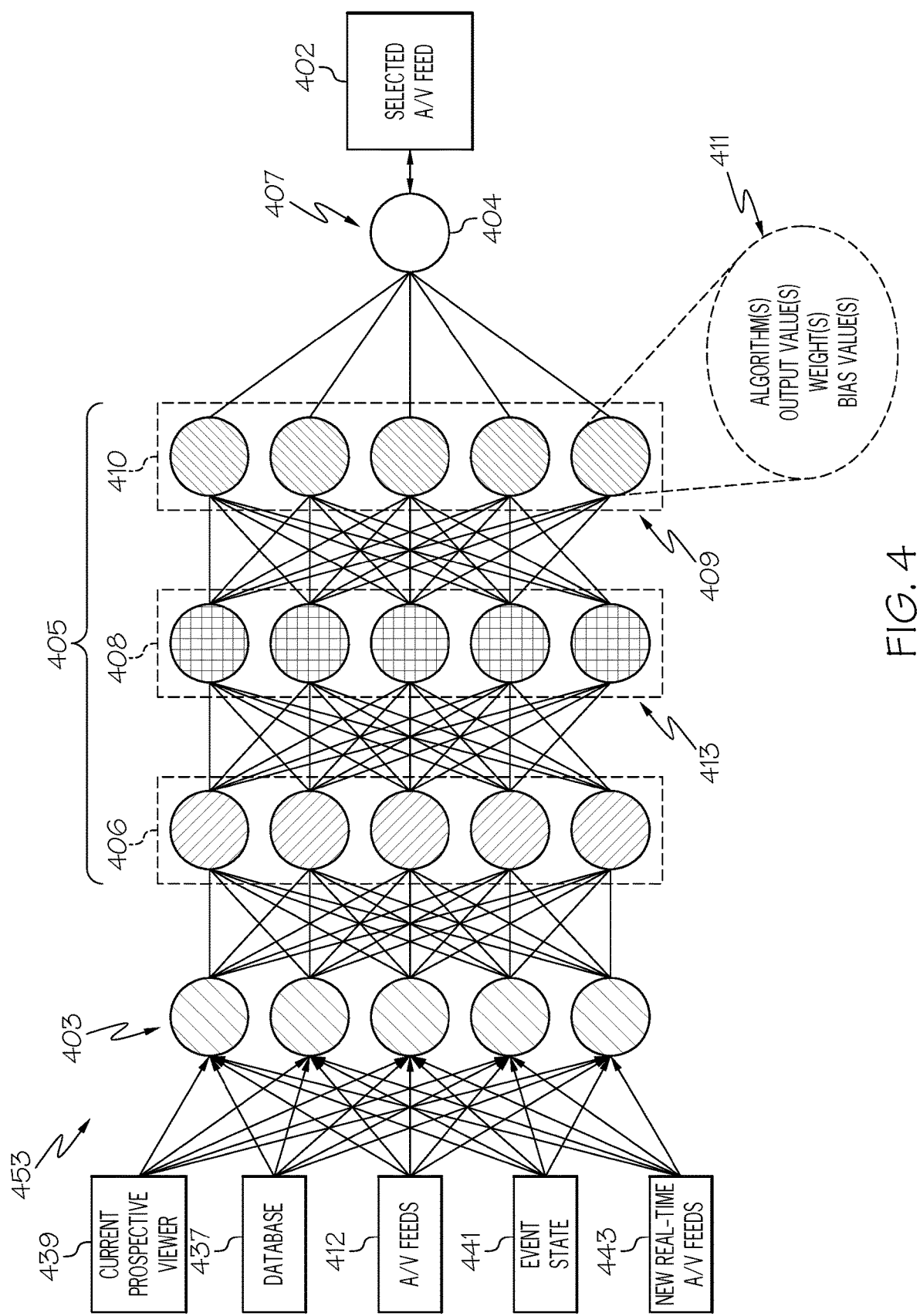
FIG. 4 depicts an exemplary Deep Neural Network (DNN) as used in one or more embodiments of the present invention.
Figure 7:
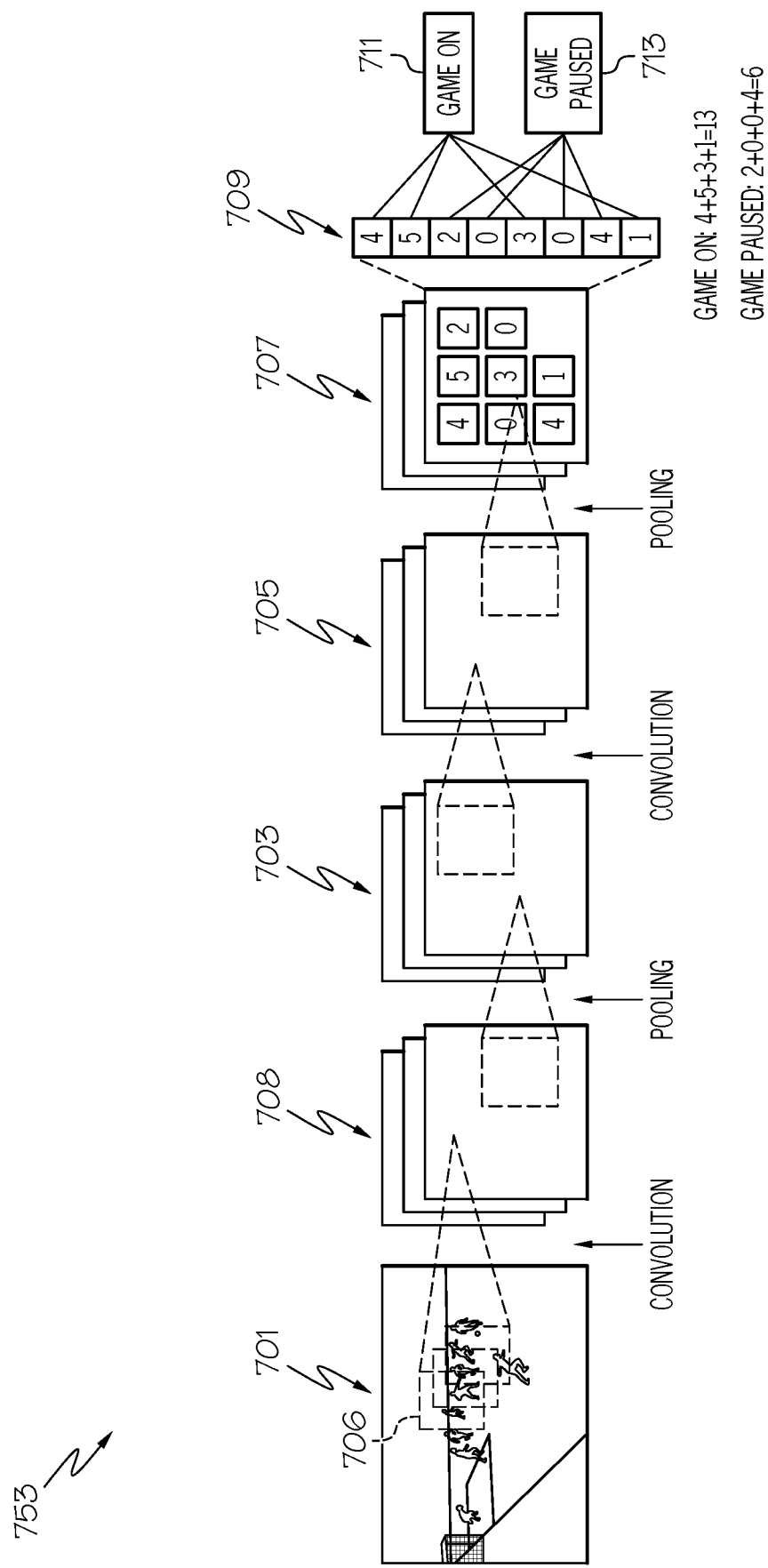

The pre-processed video feeds 313 are sent to an Artificial Intelligence (AI) system 353 (analogous to AI system 153 shown in FIG. 1 and/or Deep Neural Network 423 shown in FIG. 4, and/or Convolutional Neural Network (CNN) 753 shown in FIG. 7), as shown in the selection layer 304, which selects a particular video feed from the pre-processed video feeds 313, and sends that selected video feed as AI video 323 to a video operator 317 (e.g., a person and/or computer system that acts as a producer of a broadcast program). If video operator 317 is a human, then a human annotated feedback 319 is sent to the AI system 353 in order to further train it using the "ground truths" provided by this human producer of the broadcast program. If video operator 317 is another AI system, then that other AI system sends feedback similar to the human annotated feedback 319 to the AI system 353 in order to further train it using the "ground truths" provided by this other AI system.

As shown in FIG. 3, and in one or more embodiments of the present invention, a copy of all of the pre-processed video feeds 313 are also sent to the video operator 317, thus allowing the video operator 317 to accept or override the AI video 323 from the AI system 353.

Similarly, the microphones 303 send an audio feed 309 to an audio preprocessor 311 in that pre-processing layer 302 of the architecture 300 in order to create pre-processed audio feeds 325. An exemplary audio preprocessor 311 adjusts the audio acuity of the audio feed 309, blocks any audio feeds that are of sub-par quality (e.g., due to wind blowing across a microphone), etc. As with the video preprocessor 307, the audio preprocessor 311 does not adjust or block any audio feeds based on their content, since this is the job of the AI system 353.

The pre-processed audio feeds 325 are sent to the AI system 353, which selects a particular audio feed from the pre-processed audio feeds 325, and sends that selected audio feed as AI audio 329 to an audio operator 331 (e.g., a person and/or computer system that acts as a producer of a broadcast program). If audio operator 331 is a human, then a human annotated feedback 333 is sent to the AI system 353 in order to further train it using the "ground truths" provided by this human producer of the broadcast program. If video operator 317 is another AI system, then that other AI system sends feedback similar to the human annotated feedback 333 to the AI system 353 in order to further train it using the "ground truths" provided by this other AI system.

As shown in FIG. 3, and in one or more embodiments of the present invention, a copy of all of the pre-processed audio feeds 325 are also sent to the audio operator 331, thus allowing the audio operator 331 to accept or override the AI audio 329 from the AI system 353.

As shown in FIG. 3, a database 337 exchanges information with the AI system 353. The AI system 353 (e.g., Deep Neural Network (DNN) 423 described below in FIG. 4) uses this information to decide which A/V feed to broadcast to a particular type of viewer. In one or more embodiments of the present invention, database 337 includes multiple types of databases.

For example, and in one or more embodiments of the present invention, a games database 339 contains a record of A/V feeds of particular types of events (e.g., soccer games) that the AI system has selected in the past for transmission to a particular type of viewer. A custom preferences database 341 describes profiles of different types of viewers that have received specific types of A/V streams in the past. A feedback records database 343 describes ground truths that have been provided in the past to the AI system 353 that have overridden previous decisions made by the AI system 353.

The video operator 317 sends a final video stream 321 to a synchronization and streaming layer 306, and the audio operator 331 sends a final audio stream 335 to the synchronization and streaming layer 306, which combines these two streams into a final A/V stream 345. That is, the synchronization and streaming layer 306 utilizes known sound/video mixing technology to combine the final video stream 321 and the final audio stream 335. The final A/V stream 345 is actually made up of multiple concurrent A/V streams, each of which can be selectively broadcast to an end viewer based on the game state and other features of a particular concurrent A/V stream, as well as the profile of the end viewer.

As such, the final A/V stream 345 is sent to a personalization layer 308, which selects a particular concurrent A/V stream to send to a particular type of viewer/audience based on the content of that particular concurrent A/V stream and one or more of the user profiles 347. That is, the final video stream 321 and/or the final audio stream 335 include metadata that describes a type of audience that is best suited for receiving the final A/V stream 345. The personalization layer 306 compares this metadata to metadata found in the user profiles 347, and then transmits/broadcasts a particular concurrent A/V stream from that final A/V stream 345 to the appropriate viewer 349 whose profile in the user profiles 347 matches the user profile metadata found in that particular concurrent A/V stream.

Other concurrent A/V streams from the final A/V stream 345, whose profile metadata matches other viewers, are transmitted/broadcasted to those other viewers.

In one or more embodiments of the present invention, FIG. 3 describes an exemplary Machine Learning training setup of the architecture 300. That is, training input data from the cameras 301 and microphones 303 (and in one or more embodiments, Doppler sensors (not shown) that also provide input to the AI system 353 for processing similar to that described for the audio and video inputs) generate a training AI A/V feed, which can be overridden by an operator using his/her golden truth of the optimal A/V feed, which the AI system 353 uses to be further trained in order to decide which A/V feed to use.

Once training is complete, the architecture 300 is used at run-time (i.e., during a live event).

Thus, as run-time, the AI system 353 inputs the pre-processed video feeds 313 and the pre-processed audio feed 325, as well as, manual selections from the video operator 317 and from the audio operator 331 (if available). The AI system 353 maps to pre-defined game states specific to each sport. In turn, the current "GAME STATE" resolves to a certain audio mix configuration.

In one or more embodiments of the present invention, the concurrent audio/video streams from the final A/V stream 345, as well as the final video stream 321 and the final audio stream 335, are an array of prioritized streams (curated streams) according to a ranking algorithm. Part of the ranking algorithm can exclude streams deemed of low quality or containing restricted material. This allows a personalization layer for each individual stream user having a unique type of profile.

With reference now to FIG. 4, an exemplary deep neural network (DNN) 453 (analogous to AI system 153 shown in FIG. 1) as utilized in one or more embodiments of the present invention is presented. The nodes within DNN 453 represent hardware processors, virtual processors, software algorithms, or a combination of hardware processors, virtual processors, and/or software algorithms.

In one or more embodiments of the present invention, DNN 453 is trained to recognize a particular type of A/V feed (from an event) for a particular type of viewer, based on the state of the event (e.g., from a games database), custom preferences of a viewer, and/or feedback records from previous events/games. Thus, DNN 453 is initially trained using training data from database 437 (analogous to database 337 shown in FIG. 3) and training A/V feeds from A/V feeds 412.

DNN 453, as the name suggests, is an electronic neural network. As the name implies, an electronic neural network is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

The electronic neurons (also referred to herein simply as "neurons" or "nodes") in DNN 453 are arranged in layers, known as an input layer 403, hidden layers 405, and an output layer 407. The input layer 403 includes neurons/nodes that take input data, and sends it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often a single node for holding vector information.

As just mentioned, each node in the depicted DNN 453 represents an electronic neuron, such as the depicted neuron 409. As shown in block 411, each neuron (including neuron 409) functionally includes at least four features: algorithm(s), an output value(s), weight(s), and bias value(s).

The algorithm(s) are mathematic formula(s) for processing data from one or more upstream neurons. For example, assume that one or more of the neurons depicted in the middle hidden layers 405 send data values to neuron 409. Neuron 409 then processes these data values by executing the algorithm(s) shown in block 411, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the DNN 453 to be further "fine-tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the algorithm(s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the algorithm(s) in the neuron 413. Alternatively, the output of neuron 409 can be minimized by decreasing the weight and/or bias used to affect the output of neuron 409. These weights/biases are adjustable for one, some, or all of the neurons in the DNN 453, such that a reliable output will result from output layer 407. In one or more embodiments of the present invention, finding the values of weights and bias values is done automatically by training the neural network. In one or more embodiments of the present invention, manual adjustments are applied to tune hyperparameters such as learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted during the training of DNN 453, the weights are adjusted by the user, sensor logic, etc. in a repeated manner until the output from output layer 407 matches expectations. For example, assume that input layer 403 receives training inputs that describe a particular type of step failure and solutions for that type of step failure. Once DNN 453 has been properly trained (by adjusting the algorithm(s), output value(s), weight(s), and/or bias value(s) in one or more of the electronic neurons within DNN 453), the trained DNN 453 will output a vector/value to the output layer 407, indicating that the neuron 404 describes a particular type of A/V feed for a particular type of viewer, which is presented in the output depicted as selected A/V feed 402. The selected A/V feed 402 is then sent to a transmitter for broadcast to that particular type of viewer.

When automatically adjusted, the weight(s) and/or bias value(s) are adjusted using "back propagation", in which weight(s) and/or bias value(s) of the neurons are adjusted by using a "gradient descent" method that determines which direction each weight/bias should be adjusted to. This gradient descent process moves the weight/bias in each neuron in a certain direction until the output from output layer 407 improves (e.g., accurately describes which concurrent A/V feed should be broadcast to a particular type of viewer).

As shown in FIG. 4, various layers of neurons are shaded differently, indicating that, in one or more embodiments of the present invention, they are specifically trained for recognizing different aspects of a candidate concurrent A/V feed and/or a policy that controls such A/V feeds.

Thus, in one or more embodiments of the present invention, within the hidden layers 405 are layer 406, which contains neurons that are designed to evaluate an audio portion of the A/V feeds 412 (e.g., features of the audio feeds, such as the sound of a bat hitting a pitched ball); layer 408, which contains neurons that are designed to evaluate a video portion of the A/V feeds 412 (e.g., actions depicted in the A/V feeds 412, such as a ball being pitched, and/or the event state 441); and layer 410, which contains neurons that are designed to recognize a profile for a prospective viewer of a particular A/V feed from the A/V feeds 412 (e.g., a viewer who is a fan of college bands, who will receive an A/V feed of a college band playing in the stands at a game).

The outputs of neurons from layer 410 then control the value found in output layer 407.

Thus, in order to train DNN 453 to recognize a particular concurrent A/V feed for transmittal to a particular type of viewer, database 437 contains known features of a particular type of event (e.g., games database 339 shown in FIG. 3). "Fine tuning" by a human or another intelligent system of the DNN 453 uses the feedback records database 343 shown in FIG. 3 and/or the event state 441, described below). The final decision for which concurrent A/V feed to use incorporates the use of features of a particular type of viewer for a particular type of A/V feed for an event (e.g., custom preferences database 341 shown in FIG. 3). The DNN 453 receives concurrent A/V feeds 412, which are known types of A/V feeds for known types of events (e.g., sporting events), and matches different A/V feeds from the known concurrent A/V feeds to particular types of viewers. This selection/match of a particular A/V feed from the known concurrent A/V feeds is output as the selected A/V feed 402.

Once DNN 453 is trained, then a profile of a current prospective viewer 439 of a new real-time A/V feeds 443) are used to match that current prospective viewer to a particular concurrent A/V feed from the new real-time A/V feeds 443, in order to output the selected A/V feed 402 for that particular current prospective viewer, as described in FIG. 3. That is, the viewer profile is part of data shown as current prospective viewer 439, and metadata describing the features of the different concurrent A/V feeds in the new real-time A/V feeds 443 for a particular real-time event, are matched by the DNN 453 in order to output the particular A/V feed (selected A/V feed 402) that is appropriate for that current prospective viewer. In one or more embodiments of the present invention, an event state 441 of the particular real-time event is determined by another AI system, such as the Convolutional Neural Network (CNN) 753 described in FIG. 7, in order to further match a particular concurrent A/V feed to a particularly type of current prospective viewer.

While FIG. 4 depicts an embodiment of the present invention in which a DNN is used to determine which concurrent A/V feed to send to a particular type of end viewer/audience, unsupervised reinforced learning, such as Q-learning, can be utilized in one or more embodiments of the present invention.

Unsupervised reinforced learning is an artificial intelligence system that uses trial and error to eventually find an optimal approach to a task. For example, if the task is to hit a ball with a bat, a robot will randomly swing a bat at the pitched ball. If the bat swings above or below the pitched ball, or if the bat swings before or after the pitched ball passes by the bat, then a negative value (i.e., a negative reward) is given to the actions of the bat, thus encouraging the robot not to take such a swing. However, if the bat "tips" the pitched ball, then a positive reward/value is given to the robot for this swing, thus encouraging the robot to take such a swing. If the bat connects solidly with the pitched ball, then an even higher reward/value is given to the robot for taking this swing, thus encouraging the robot even further to take such a swing.

A Q-learning reinforced learning system uses a Q-learning algorithm, which updates Q values of rewards when the actor/robot performs a certain action (swinging a bat) in a certain state (when the pitched ball is approaching the robot).

Using these same approaches with the present invention, an unsupervised reinforced learning and/or a Q-learning reinforced learning system learns which solution is best suited for choosing a particular concurrent A/V feed for a particular type of viewer based on how closely it matches that particular type of viewer based on other A/V feed—viewer comparisons.

In order to evaluate the audio and/or video portions of an A/V feed, one or more embodiments of the present invention utilize a Convolutional Neural Network (CNN). That is, in one or more embodiments of the present invention, a CNN is used not only to analyze video components of an A/V feed, but is also used to analyze the audio components of that A/V feed in order to determine the event state of an event, such as a sporting event. This analysis allows the CNN to 1) analyze images and audio from a real-time event in order to determine the game state of the real-time event; and 2) provide this game state to DNN 453 as event state 441, as depicted in FIG. 4.

A CNN is similar to a DNN in that both utilize interconnected electronic neurons. However, a CNN is different from a DNN in that 1) a CNN has neural layers whose sizes are based on filter sizes, stride values, padding values, etc. (see FIG. 6) and 2) a CNN utilizes a convolution scheme to analyze image and/or audio data (see FIG. 7). A CNN gets its "convolutional" name based on a convolution (i.e., a mathematical operation on two functions to obtain a result) of filtering and pooling pixel data (a mathematical operation on two functions) in order to generate a predicted output (obtain a result).

Figure 5:
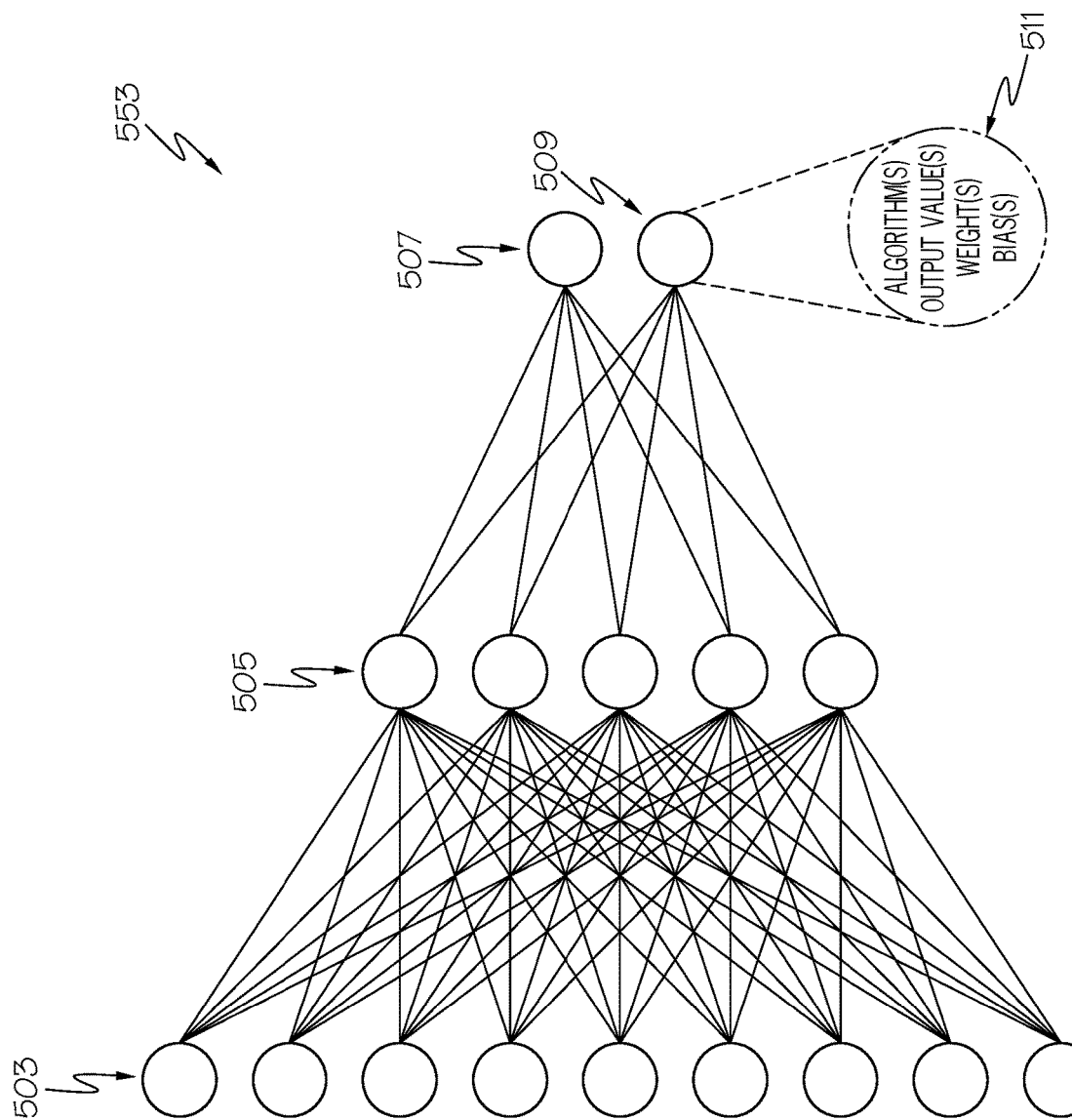
FIG. 5, FIG. 6, and FIG. 7 describe components of an exemplary Convolutional Neural Network (CNN) as used in one or more embodiments of the present invention.

With reference now to FIG. 5, an exemplary high-level representation of a Convolutional Neural Network (CNN) 553 as used in one or more embodiments of the present invention is presented. Each depicted node in FIG. 5 represents a neuron (i.e., an electronic neuron). In accordance with one or more embodiments of the present invention, an input layer 503 includes neurons that receive data that describes pixels from a video image, digital data and/or waveform data from an audio stream, etc. Rather than being connected to an equal number of neurons (as in a DNN), the neurons from the input layer 503 of the CNN 553 connect to a fewer number of neurons in a middle layer 505, which connect to an even fewer number of neurons in the output layer 507. However, it is not necessarily always the case that the number of neurons in subsequent layers in the CNN 553 are decreased. For example, CNN 553 can have a middle layer 505 that is the same size as the input layer 503, or can have a middle layer 505 that is larger than the size of the input layer 503, depending on how the CNN 553 is designed. More specifically, for a given convolutional layer and/or pooling layer, the filter size, the stride value, and the padding (e.g., weight) value of the neuron(s) determine the size of the next layer. While a CNN used in one or more embodiments of the present invention has convolutional layers and pooling layers, in one or more other embodiments of the present invention, the CNN has other types of layers like deconvolution layers and upsampling layers. Those generally increase the size of the following layer.

As just mentioned, each node in the depicted CNN 553 represents an electronic neuron, such as the depicted neuron 509. As shown in block 511, each neuron (including neuron 509) functionally includes at least four features: algorithm(s), output value(s), weight(s), and bias value(s), all of which are analogous to the algorithm(s), output value(s), weight(s), and bias value(s) describe above in block 411 for DNN 423 shown in FIG. 4.

When CNN 553 is manually adjusted (trained), the weights are adjusted by the user, sensor logic, etc. in a repeated manner until the output from output layer 507 matches expectations. For example, assume that input layer 503 receives training pixel values (color, intensity, shading, etc.) from a video portion of a training A/V stream. If the output from output layer 507 is a vector that is predetermined to describe a game in progress (e.g., (1,2,4,10)), then during the training of the CNN 553 the weights (and alternatively the algorithms) are adjusted until the vector (1,2,4,10), or a vector that is mathematically similar, is output from output layer 507 when an A/V stream of a game in progress is input into input layer 503. However, If the output from output layer 507 is a vector that is predetermined to describe a game that is paused (e.g., (1,3,5,9)), then during the training of the CNN 553 the weight(s), algorithm(s), and/or bias value(s) are adjusted until the vector (1,3,5,9), or a vector that is mathematically similar, is output from output layer 507 when an A/V stream of a game that is paused is input into input layer 503.

When automatically adjusted, the weight(s), algorithm(s), and/or bias value(s) are adjusted using "back propagation", in which weight values of the neurons are adjusted by using a "gradient descent" method that determines which direction each weight value should be adjusted to. This gradient descent process moves the weight in each neuron in a certain direction until the output from output layer 507 improves (e.g., either gets closer to (1,2,4,10) or (1,3,5,9), depending on what the video portion of the known A/V stream depicts).

Figure 6:
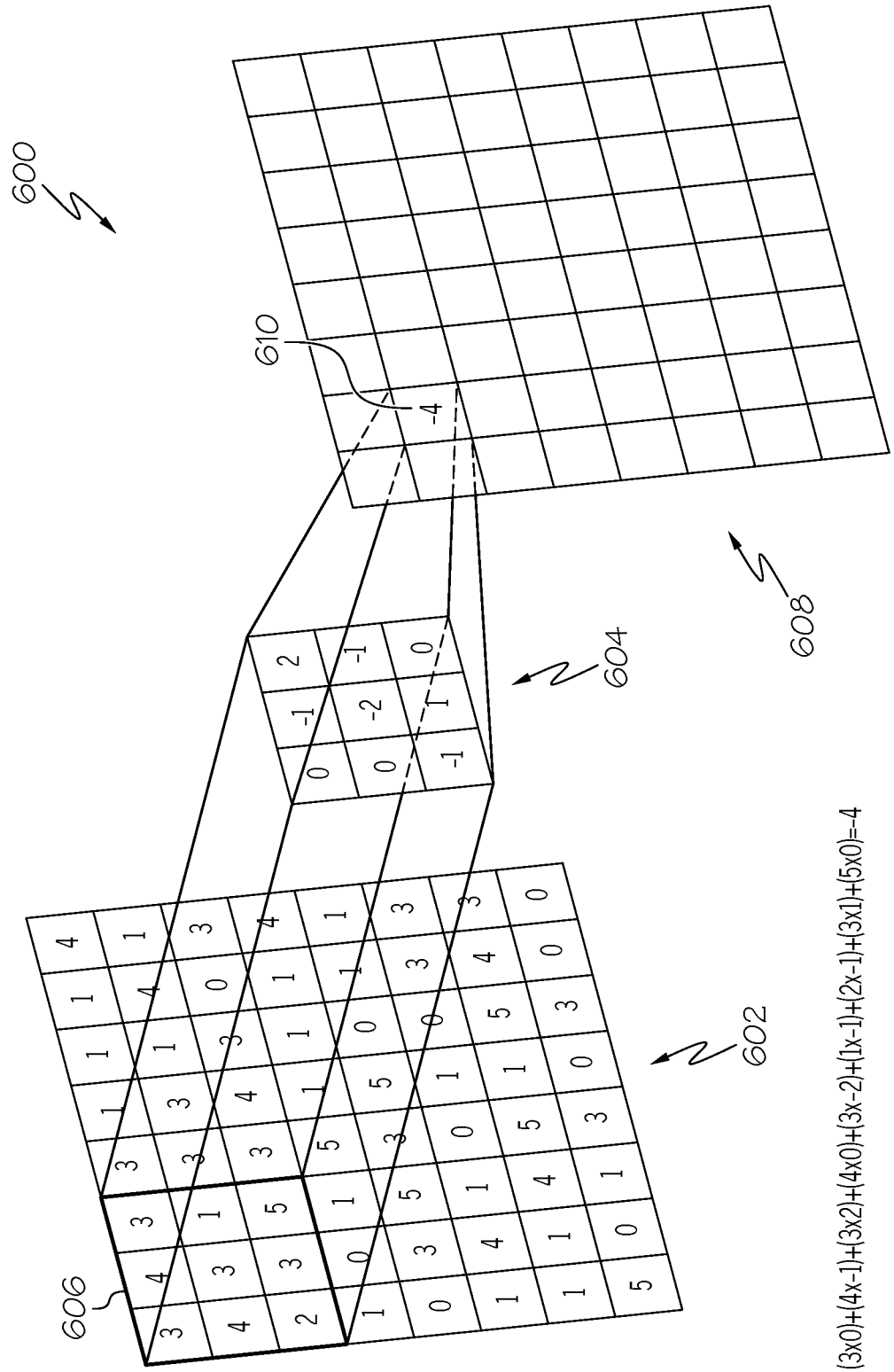

Once the CNN 553 is trained, it can now recognize a game state of an event, as described in the CNN process shown in FIG. 6 and FIG. 7.

As described herein, a CNN process includes 1) a convolution stage (depicted in FIG. 6), followed by a 2) pooling stage and a classification stage (depicted in FIG. 7).

With reference now to FIG. 6, a convolution stage to analyze an A/V stream is presented as CNN convolution process 600. As shown in FIG. 6, pixel data from a video stream or sound data (e.g., a digitized version of a sound wave) from an A/V stream populates an input table 602, which conceptually is similar to the input layer 503 shown in FIG. 5. Each cell in the input table 602 represents a value of a pixel from the video stream and/or a value of a digital value from a digitized sound wave. This value is based on the color and intensity for each pixel of the frequency and amplitude of the digitized sound wave (where each digitized unit of the sound is referred to herein as a "sound byte"). A subset of pixels/sound bytes from the input table 602 is associated with a filter 604, which conceptually is similar to the middle layer 503 shown in FIG. 5.

As shown in FIG. 6, filter 604 is matched to a same-sized subset of pixels (e.g., pixel subset 606) or sound bytes by sliding the filter 604 across the input table 602. The filter 604 slides across the input grid at some predefined stride (i.e., one or more pixels/sound bytes). Thus, if the stride is "1", then the filter 604 slides over in increments of one (column) of pixels/sound bytes. In the example shown in FIG. 6, this results in the filter 604 sliding over the subset of pixels/sound bytes shown as pixel/sound byte subset 606 (3,4,3,4,3,1,2,3,5 when read from left to right for each row) followed by filter 604 sliding over the subset of pixels/sound bytes just to the right (4,3,3,3,1,3,2,5,3). If the stride were "2", then the next subset of pixels/sound bytes that filter 604 would slide to would be (3,3,1,1,3,3,5,3,4).

Filter 604 is applied against each pixel/sound byte subset using a mathematical formula. That is, the values in the filter 604 are added to, subtracted from, multiplied by, divided by, or otherwise used in a mathematical operation and/or algorithm with the values in each subset of pixels/sound bytes. For example, assume that the values in filter 604 are multiplied against the pixel/sound byte values shown in pixel/sound byte subset 606 ((3×0)+(4x−1)+(3×2)+(4×0)+(3x−2)+(1x−1)+(2x−1)+(3×1)+(5×0)) to arrive at the value of −4. This value is then used to populate feature map 608 (which is conceptually similar to output layer 507 shown in FIG. 5) with the value of −4 in cell 610.

In a preferred embodiment, the convolution step also includes use of an activation function, which transforms the output of the convolution operation into another value. One purpose of the use of an activation function is to create nonlinearity in the CNN. A choice of specific activation function depends on an embodiment. Popular choices of an activation function include a rectified linear unit (ReLU), a leaky ReLU, a sigmoid function, a tanh function, and so on.

In an embodiment, each subset of pixels/sound bytes uses a same filter. However, in a preferred embodiment, the filter used by each subset is different (i.e., one filter for evaluating video pixels and another filter for evaluating digital sound bytes), thus allowing a finer level of granularity in creating the feature map.

With reference now to FIG. 7, the pooling stage and a classification stage (as well as the convolution stage) of a CNN 753 (analogous to the CNN 553 shown in FIG. 5) during inference processing is depicted. That is, once the CNN 553/753 is optimized by adjusting weights and/or algorithms in the neurons (see FIG. 5), by adjusting the stride of movement of the pixel/sound byte subset 606 (see FIG. 6), and/or by adjusting the filter 604 shown in FIG. 6, then it is trusted to be able to recognize similar types of audio and/or video feeds, in order to determine the game state of the event that is depicted by such audio/video feeds. This optimized CNN is then used to infer (hence the name inference processing) that the images/sounds in a new A/V feed depict the game state the CNN 553/753 has been trained to recognize.

While CNN 553/753 is described herein as being able to analyze both video feeds and audio feeds, for purposes of illustration FIG. 7 discusses only the analysis of video feeds. However, it is understood that a similar process is also performed on digitized audio feeds in one or more embodiments of the present invention, in order to further determine the game state of the event shown in the A/V feed.

As shown in FIG. 7, assume that pixels from a video feed 701 are used as inputs to the input table 602 shown in FIG. 6, using a CNN that has been previously defined and optimized to recognize a particular game state of an event. Assume further that a series of pixel subsets, including the pixel subset 706 (analogous to pixel subset 606 shown in FIG. 6) are convolved (using the process described in FIG. 6), thus resulting in a set of feature maps 708 (analogous to feature map 608 shown in FIG. 6). Once the feature maps 708 are generated, they are pooled into smaller pooled tables 703, in order to reduce the dimensionality of the values, thereby reducing the number of parameters and computations required in the CNN process. Once these pooled tables 703 are created, they themselves are then convoluted to create new (and even more compressed) feature maps 705, which are then pooled to create even more compressed pooled tables 707.

The pooled tables 707 (which in an embodiment is actually a single table) are "unrolled" to form a linear vector, shown in FIG. 7 as a fully connected layer 709. Fully connected layer 709 is connected to prediction output, including prediction output 711 (that the video stream is that of an event in which the game state is "game on") and prediction output 713 (that the video stream is that of an event in which the game state is "game paused").

For example, assume that for a prediction output to be considered accurate, it must have an arbitrarily chosen total value of 10 or greater for the sum of values from cells in the fully connected layer 709 to which it is connected. As such, the prediction output 711 is connected to cells in the fully connected layer 709 that have the values of 4, 5, 3, and 1, resulting in a sum total of 13. Thus, the CNN 753 concludes that video feed 701 is for a game that is currently active ("game on").

In one or more embodiments, an output function, such as a softmax function, amplifies larger output values, attenuates smaller output values, and normalizes all output values in order to ensure that their total sum is one. That is, rather than assigning an arbitrary number (e.g., 10) as being what the sum total of values in certain cells from the connected layer 709 must exceed in order to indicate that a video feed (e.g., of a game that is actively being played) is portrayed in the new video feed, an output function such as a softmax function dynamically adjusts the output values and then normalizes them, such that they sum up to 1.0 or some other predetermined number. Thus, while the described values shown in FIG. 7 describe the concept of output values describing entities in the A/V feeds, in practice a static threshold value is not used in certain embodiments. Rather, in this alternative/preferred embodiment, the system utilizes a normalized summation (as just described), in order to further control the output characteristics, thus more accurately determining the label of the state of the event being presented in the A/V feeds.

The prediction output 713 that the game is currently paused (e.g., for a timeout, halftime, etc.) is only 6 (2+0+0+4) based on the cells in the fully connected layer 709 to which it is attached. However, if the pixels in the video feed 701 were of a game that is actually paused, then the fully connected layer 709 (if properly trained) would result in the values of the cells in the fully connected layer 709 that are connected to the prediction output 711 to total less than 10, while the values of the cells in the fully connected layer 709 that are connected to the prediction output 713 would be more than 10.

Figure 8:
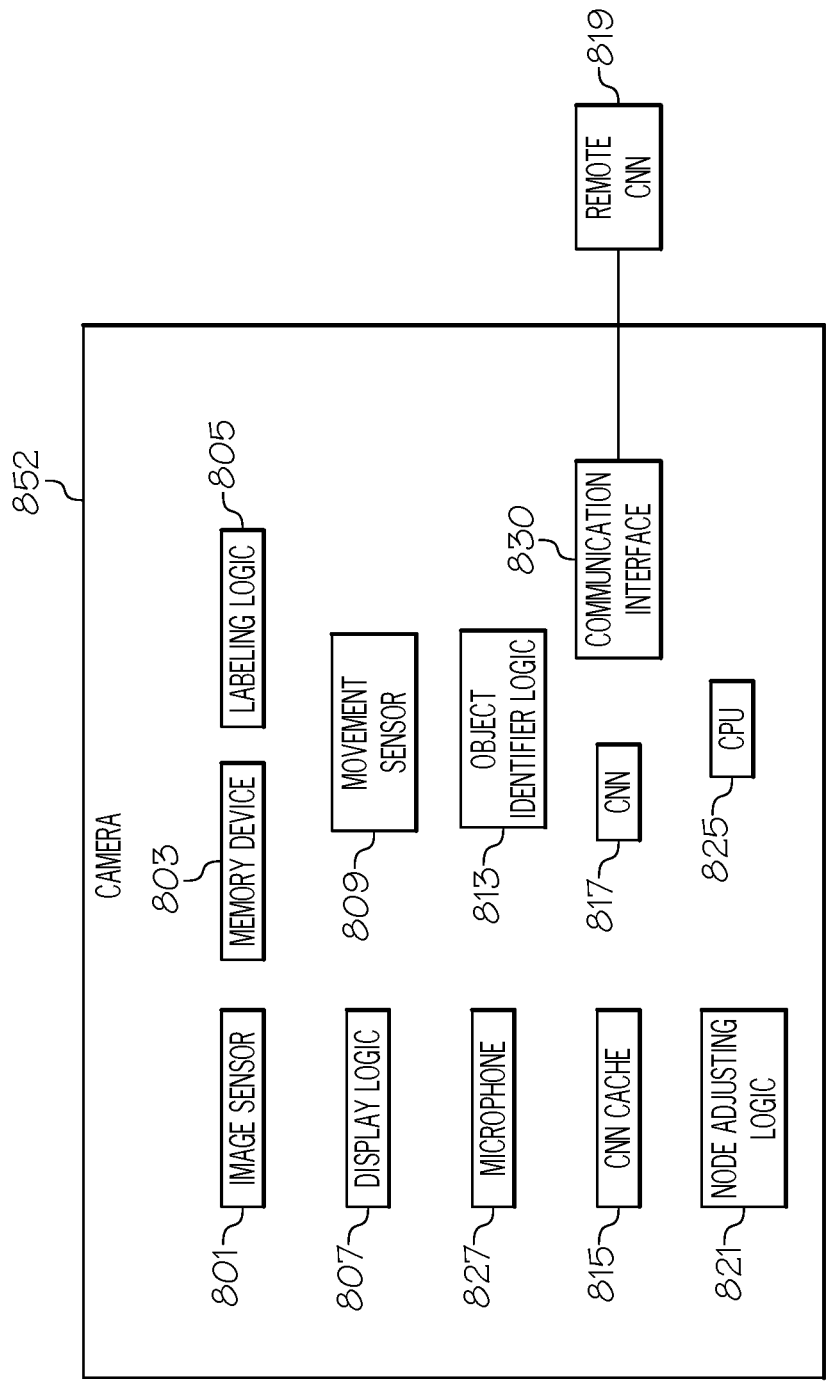
FIG. 8 illustrates details of a sensor-enabled camera utilized in one or more embodiments of the present invention.

Assume now that the video feed 701 shown in FIG. 7 has been taken by a camera, such as camera 852 described in FIG. 8 (analogous to camera 152 shown in FIG. 1), in accordance with one or more embodiments of the present invention is presented. Components of camera 852 include, but are not limited to, the following components in one or more embodiments of the present invention.

Image sensor 801 is an optic sensor (e.g., a Complementary Metal-Oxide-Semiconductor CMOS) that converts light into an electronic signal, which is then sent to a memory device 803 (e.g., a memory card).

Labeling logic 805 is a hardware circuit that converts an output from an algorithm (e.g., using CNN) into a text label. For example, and in one embodiment, labeling logic takes the array (4,5,3,1) shown in FIG. 7 as an input, and outputs a label "Game On", which can be used as metadata in the event state 441 shown in FIG. 4. In another embodiment, labeling logic 805 is executed software that performs this function.

Movement sensor 809 is a sensor that detects movement of the camera 852. In an embodiment of the present invention, movement sensor 809 is a self-contained unit, such as an accelerometer. In another embodiment, movement sensor 809 uses inputs from an external device (not shown), such as a gear or wheel. That is if camera 852 is mounted on a track, and the movement of camera 852 along the track is causes by gears/wheels in a mechanical device turning (thus propelling the camera), sensor readings describing the movement of such gears/wheels accurately describe the movement of the camera 852.

A microphone 827, analogous to one or more of the microphones 303 depicted in FIG. 3, captures audio sounds.

A CNN cache 815 caches outputs of the CNN 817 and/or inputs to the CNN 817, in order to improve the efficiency of CNN 817 for receiving inputs to (e.g., CNN inputs that are analogous to the inputs to DNN 453 shown in FIG. 4) and storing outputs from the CNN 817 (e.g., CNN outputs that are analogous to the selected A/V feed 402 shown in FIG. 4).

The object identifier logic 813 is logic (e.g., the CNN 817, which may be a full version of the CNN 753 shown in FIG. 7 or an abbreviated version of the CNN 753 described herein) used to identify a state of an A/V feed. In an embodiment, if the camera 852 has sufficient processing power to run a full version of the CNN 753, then it will do so. However, if the camera 852 has insufficient processing power to run a full version of the CNN, then a limited version (e.g., in which only one convolution/pooling operation is performed, in which only a limited number of prediction outputs is supported, etc.) is performed. In another embodiment, if camera 852 has insufficient processing power to run even a limited version of the CNN 753 (CNN 817), then a communication interface 830 will connect the camera 852 to a remote CNN 819, which runs on a remote server/computer (e.g., computer 101 shown in FIG. 1). CNN 819 is a full-function version of CNN 753 in one embodiment of the present invention, or is a reduced-function version of CNN 753 in another embodiment of the present invention.

Node adjusting logic 821 is logic that adjusts weights and/or algorithms in the CNN using regressive analysis. That is, node adjusting logic 821 is a processor that has been preconfigured to determine the accuracy of the predicted outputs (as shown in the example of FIG. 7), and then adjust the weight and/or algorithm in the neurons in the CNN (see FIG. 5) until the prediction outputs accurately describe the photographed object. This process of node adjusting is preferably performed by back propagation, which reiteratively adjusts the weights/algorithm and/or bias (an offset value that adjusts the total activation level of the neuron). In another embodiment, the node adjusting logic 821 is executed software, in which the node adjusting is performed using software that directly adjusts the neurons' weights/algorithms/biases.

In an embodiment of the present invention, the functions performed by one or more of labeling logic 805, display logic 807, object identifier logic 813, CNN 817, and node adjusting logic 821 are performed by an on-board Central Processing Unit (CPU) 825 executing some or all of the instructions found in AVCBL 148 shown in FIG. 1.

Figure 9:
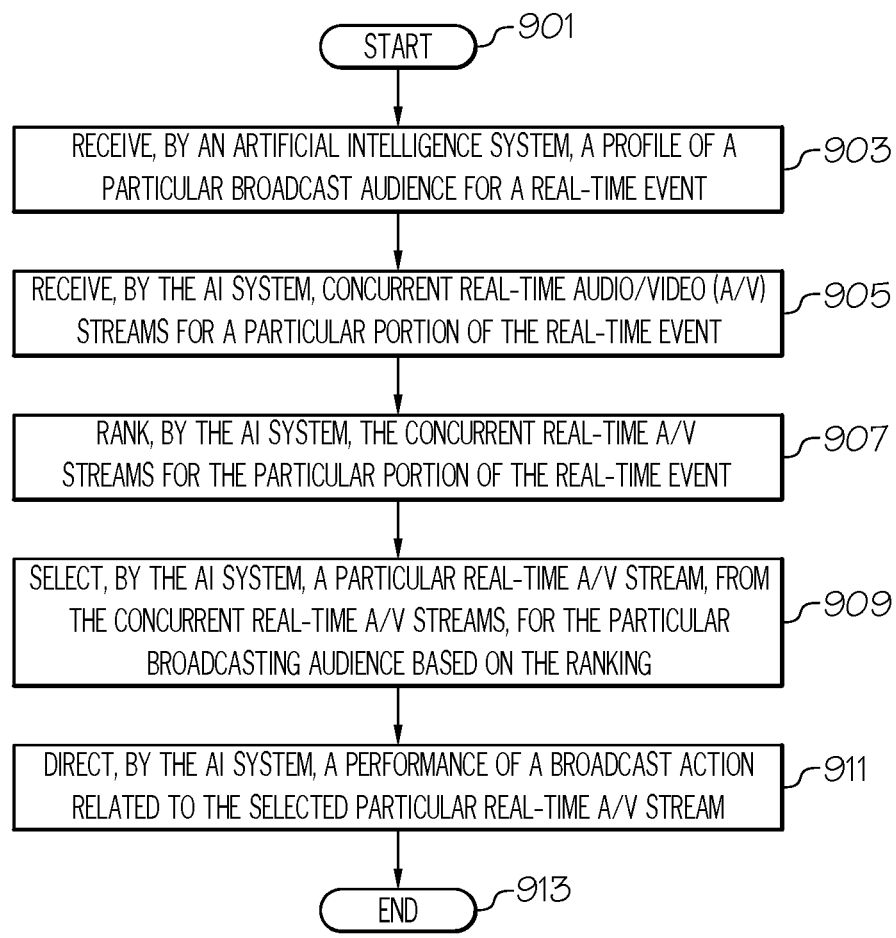
FIG. 9 is a high-level flow chart of one or more steps performed in accordance with one or more embodiments of the present invention.

With reference now to FIG. 9, a high level flow chart of one or more operations performed by one or more processors in accordance with one or more embodiments of the present invention is presented.

After initiator block 901, an Artificial Intelligence (AI) system, such as the DNN 453 shown in FIG. 4, receives a profile of a particular broadcast audience (e.g., as found in current prospective viewer 439 shown in FIG. 4) for a real-time event (e.g., a sporting event), as described in block 903.

As described in block 905, the AI system receives concurrent real-time Audio/Video (A/V) streams for a particular portion of the real-time event. That is, multiple A/V streams of a same real-time event (e.g., A/V feeds 412 shown in FIG. 4) are received by the AI system. However, each of the concurrent real-time A/V streams depict another aspect of the real-time event. For example, on concurrent real-time A/V stream could be focused on a pitcher in a baseball game, another concurrent real-time A/V stream could be focused on the batter in the baseball game, and another concurrent real-time A/V stream could be focused on fans in the stands at the baseball game.

As described herein for one or more embodiments of the present invention, the AI system has been trained to rank the concurrent real-time A/V streams for the particular portion of the real-time event based on types of event activities depicted in each of the concurrent real-time A/V streams and the profile of the particular broadcast audience for the real-time event.

As described in block 907, the AI system ranks the concurrent real-time A/V streams for the particular portion of the real-time event based on the types of event activities depicted in each of the concurrent real-time A/V streams and the profile of the particular broadcast audience for the real-time event. Thus, a specific A/V stream from the concurrent real-time A/V streams is ranked highest as best matching the preferences/profile of that particular broadcast audience for a particular game state of the event.

As described in block 909, the AI system selects a particular real-time A/V stream (e.g., the highest ranked A/V stream) from the concurrent real-time A/V streams, for the particular broadcast audience based on the ranking.

As described in block 911, the AI system then directs a performance of a broadcast action related to the selected particular real-time A/V stream, such as broadcasting the selected particular A/V stream to particular the broadcast audience; replaying for broadcast the selected particular A/V stream to the particular broadcast audience; blocking the selected particular A/V stream from being broadcast to the particular broadcast audience; etc.

The flow chart ends at terminator block 913.

In an embodiment of the present invention, the AI system receives audio signals from a physical location of the real-time event; identifies a type of event activity depicted in the particular real-time A/V stream based on the received audio signals; and adjusts the received audio signals based on the type of event activity depicted in the particular real-time A/V stream. For example, and in one or more embodiments of the present invention, assume that the crowd noise, at a soccer game represented by the audio signals, spikes up in volume. The system will assume that a goal has been scored, and will therefore increase the sound of the crowd cheer, while muting the sound of the Public Address (PA) system in the stadium.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
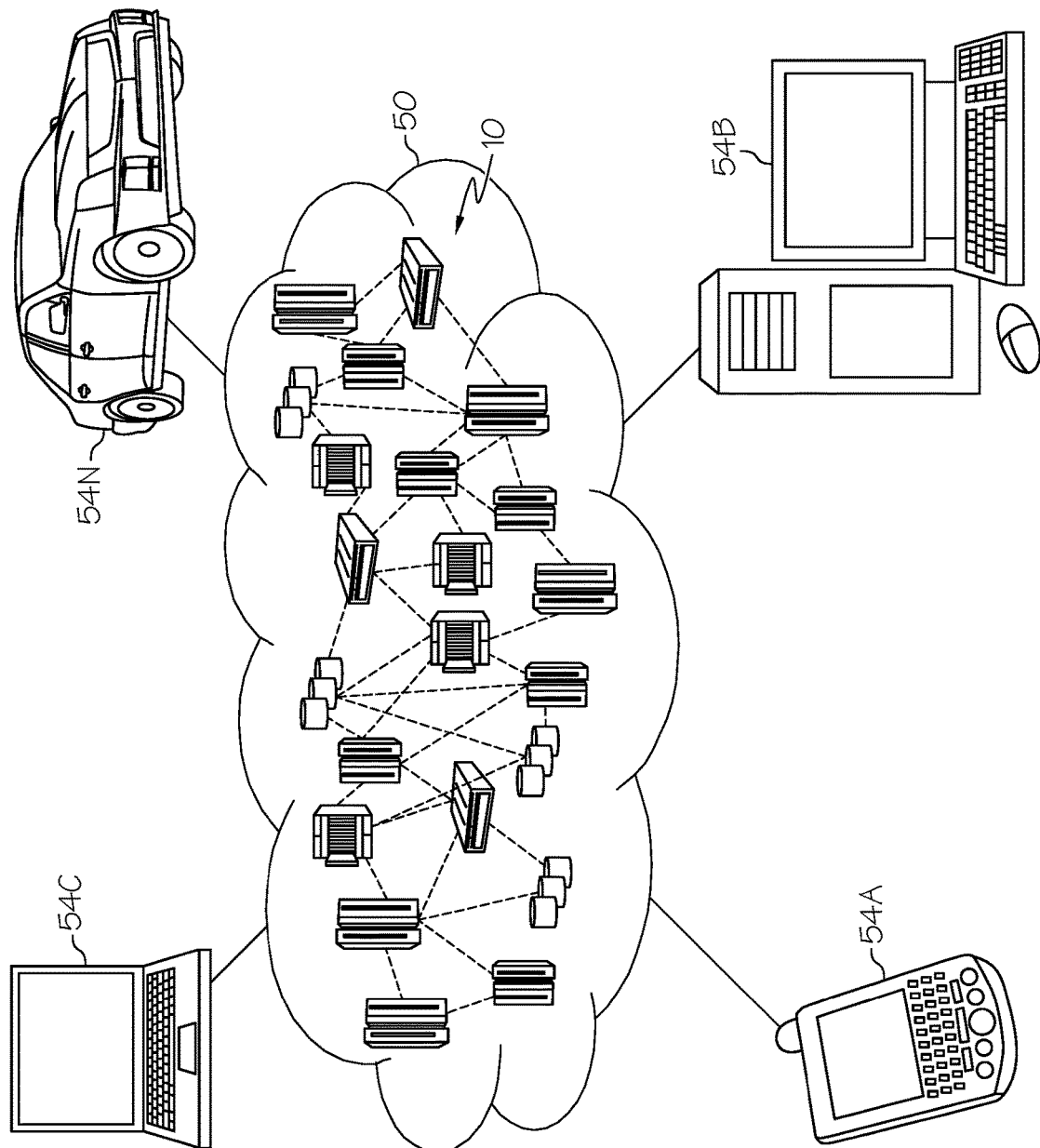
FIG. 10 depicts a cloud computing environment according to an embodiment of the present invention.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 10 are intended to be illustrative only and that computing nodes 10 and cloud computing environment 50 can communicate with any type of computerized device over any type of network and/or network addressable connection (e.g., using a web browser).

Figure 11:
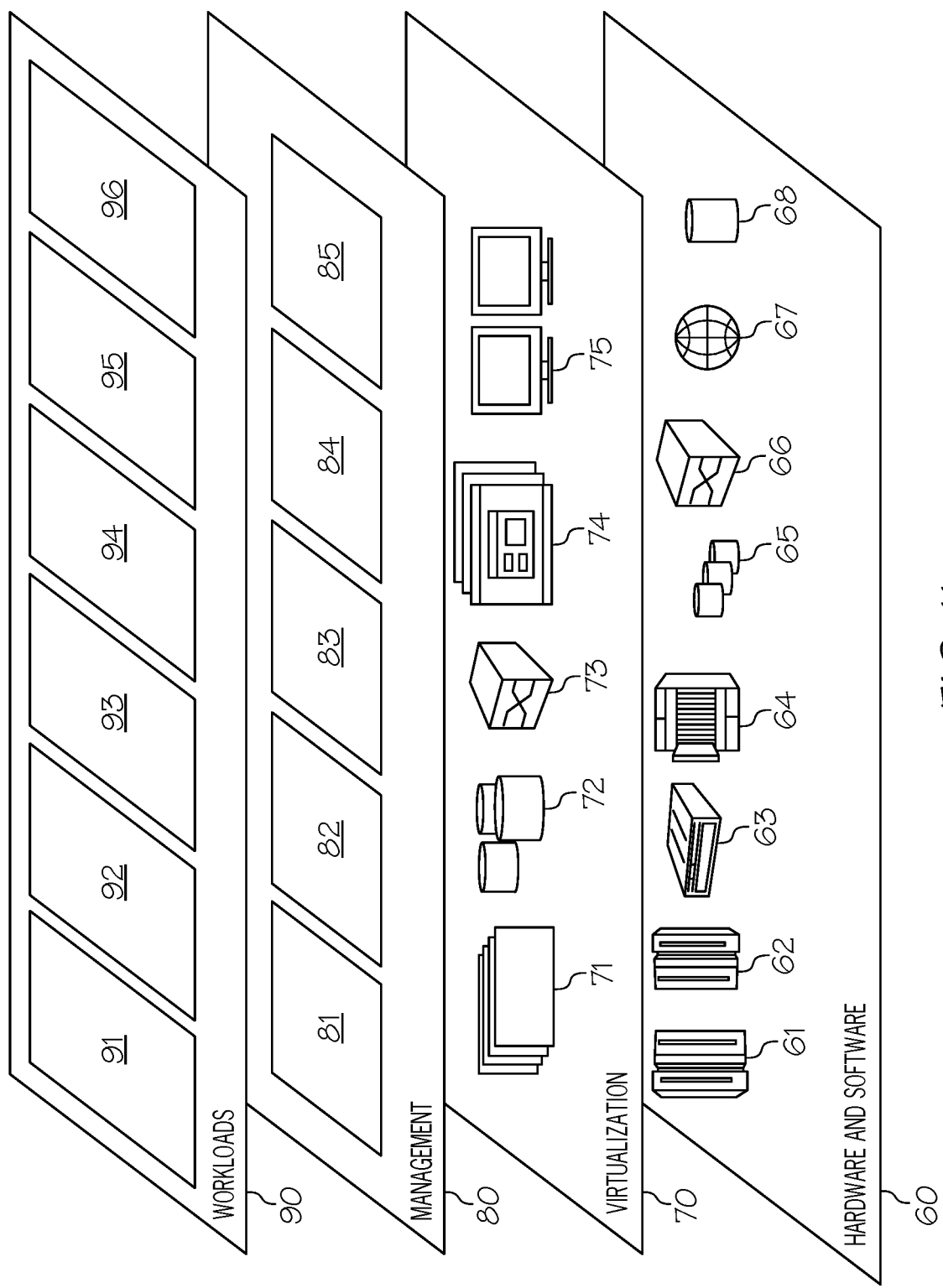
FIG. 11 depicts abstraction model layers of a cloud computer environment according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and A/V stream broadcasting processing 96, which performs one or more of the features of the present invention described herein.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for utilizing an Artificial Intelligence (AI) system to broadcast a real-time event to a particular broadcast audience, wherein the AI system is a trained neural network, the method comprising:
   receiving, by the AI system, a profile of a particular broadcast audience for a real-time event;
   receiving, by the AI system, concurrent real-time Audio/Video (A/V) streams for a particular portion of the real-time event, wherein the AI system has been trained to rank the concurrent real-time A/V streams for the particular portion of the real-time event based on types of event activities depicted in each of the concurrent real-time A/V streams and the profile of the particular broadcast audience for the real-time event;
   ranking, by the AI system, the concurrent real-time A/V streams for the particular portion of the real-time event based on the types of event activities depicted in each of the concurrent real-time A/V streams and the profile of the particular broadcast audience for the real-time event;
   selecting, by the AI system, a particular real-time A/V stream, from the concurrent real-time A/V streams, for the particular broadcast audience based on the ranking; and
   directing, by the AI system, a performance of a broadcast action related to the selected particular real-time A/V stream.

2. The method of claim 1, wherein the broadcast action is broadcasting the selected particular A/V stream to the particular broadcast audience.

3. The method of claim 1, wherein the broadcast action is replaying for broadcast the selected particular A/V stream to the particular broadcast audience.

4. The method of claim 1, wherein the broadcast action is blocking the selected particular A/V stream from being broadcast to the particular broadcast audience.

5. The method of claim 1, further comprising:
   receiving, by the AI system, audio signals from a physical location of the real-time event;
   identifying, by the AI system, a type of event activity depicted in the particular real-time A/V stream based on the received audio signals; and
   adjusting, by the AI system, the received audio signals based on the type of event activity depicted in the particular real-time A/V stream.

6. The method of claim 1, wherein the real-time event is a sporting event.

7. The method of claim 1, wherein the neural network comprises a hidden layer of neurons, wherein a first layer of neurons from the hidden layer evaluates an audio portion of the selected particular real-time A/V stream, wherein a second layer of neurons from the hidden layer evaluates an output of the first layer of neurons and a video portion of the selected particular real-time A/V stream, wherein a third layer of neurons from the hidden layer evaluates an output of the second layer of neurons and the profile of the particular broadcast audience, and wherein the third layer outputs a selection of the selected particular real-time A/V stream.

8. The method of claim 1, further comprising:
   associating, by the AI system, a specific sound with a specific physical activity during the real-time event;
   detecting, by the AI system, the specific sound in real time;
   in response to the AI system detecting the specific sound in real time, selecting, by the AI system, an A/V stream from the concurrent real-time A/V streams that captures a subsequent event that is related to the specific physical activity; and
   directing, by the AI system, a performance of a broadcast action related to the selected A/V stream from the concurrent real-time A/V streams that captures the specific physical activity.

9. The method of claim 1, further comprising:
   identifying, by the AI system, a first camera that is aimed at a location of a specific physical activity during the real-time event;
   identifying, by the AI system, a second camera that is not aimed at the location of the specific physical activity during the real-time, wherein the second camera is closer to the location of the specific physical activity than the first camera;
   determining, by the AI system, that a quality of a video feed from the first camera is below a predefined level while capturing the specific physical activity; and
   in response to the AI system determining that the quality of a video feed from the first camera is below the predefined level while capturing the specific physical activity, automatically directing, by the AI system, a broadcasting of a video feed from the second camera.

10. The method of claim 1, wherein the real-time event is a sporting event that is being broadcast, and wherein the method further comprises:
    identifying, by the AI system, a predefined state of the sporting event; and
    in response to the AI system identifying the predefined state of the sporting event, muting, by the AI system, an audio component of the selected particular real-time A/V stream.

11. The method of claim 1, further comprising:
    receiving, by the AI system, a Doppler echo sensor reading from a Doppler echo sensor at the real-time event;
    identifying, by the AI system, a particular type of action at the real-time event based on the received Doppler echo sensor reading;
    generating, by the AI system, an audio description of the identified particular type of action; and
    directing, by the AI system, a broadcast of the generated audio description of the identified particular type of action.

12. The method of claim 1, further comprising:
    training the AI system to recognize a certain physical movement that defines a game state of the real-time event, wherein the certain physical movement is captured by the selected particular real-time A/V stream.

13. The method of claim 1, further comprising:
    identifying, by a set of preprocessors, any A/V stream, from the concurrent real-time A/V streams, that has a video quality that is below a predefined quality level; and
    blocking, by the set of preprocessors, said any identified A/V stream from being operated on by the AI system.

14. The method of claim 1, further comprising:
- identifying, by a set of preprocessors, any A/V stream, from the concurrent real-time A/V streams, that has an audio quality that is below a predefined quality level; and
- blocking, by the set of preprocessors, said any identified A/V stream from being operated on by the AI system.

15. A computer program product comprising a computer readable storage medium having program code embodied therewith, wherein the computer readable storage medium is not a transitory signal per se, and wherein the program code is readable and executable by a processor to perform a method comprising:
- receiving, by an Artificial Intelligence (AI) system, a profile of a particular broadcast audience for a real-time event, wherein AI system is a trained neural network;
- receiving, by the AI system, concurrent real-time Audio/Video (A/V) streams for a particular portion of the real-time event, wherein the AI system has been trained to rank the concurrent real-time A/V streams for the particular portion of the real-time event based on types of event activities depicted in each of the concurrent real-time A/V streams and the profile of the particular broadcast audience for the real-time event;
- ranking, by the AI system, the concurrent real-time A/V streams for the particular portion of the real-time event based on the types of event activities depicted in each of the concurrent real-time A/V streams and the profile of the particular broadcast audience for the real-time event;
- selecting, by the AI system, a particular real-time A/V stream, from the concurrent real-time A/V streams, for the particular broadcast audience based on the ranking; and
- directing, by the AI system, a performance of a broadcast action related to the selected particular real-time A/V stream.

16. The computer program product of claim 15, wherein the broadcast action is broadcasting the selected particular A/V stream to the particular broadcast audience.

17. The computer program product of claim 15, wherein the broadcast action is replaying for broadcast the selected particular A/V stream to the particular broadcast audience.

18. The computer program product of claim 15, wherein the program code is provided as a service in a cloud environment.

19. An Artificial Intelligence (AI) system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
- receiving, by the AI system, a profile of a particular broadcast audience for a real-time event, wherein the AI system is a trained neural network;
- receiving, by the AI system, concurrent real-time Audio/Video (A/V) streams for a particular portion of the real-time event, wherein the AI system has been trained to rank the concurrent real-time A/V streams for the particular portion of the real-time event based on types of event activities depicted in each of the concurrent real-time A/V streams and the profile of the particular broadcast audience for the real-time event;
- ranking, by the AI system, the concurrent real-time A/V streams for the particular portion of the real-time event based on the types of event activities depicted in each of the concurrent real-time A/V streams and the profile of the particular broadcast audience for the real-time event;
- selecting, by the AI system, a particular real-time A/V stream, from the concurrent real-time A/V streams, for the particular broadcast audience based on the ranking; and
- directing, by the AI system, a performance of a broadcast action related to the selected particular real-time A/V stream.

20. The computer system of claim 19, wherein the program code is provided as a service in a cloud environment.

* * * * *